Aug. 20, 1957     J. N. YOUNG     2,803,761
ELECTROMAGNETIC APPARATUS FOR MOVING A ROD
Filed Sept. 10, 1956     2 Sheets-Sheet 1
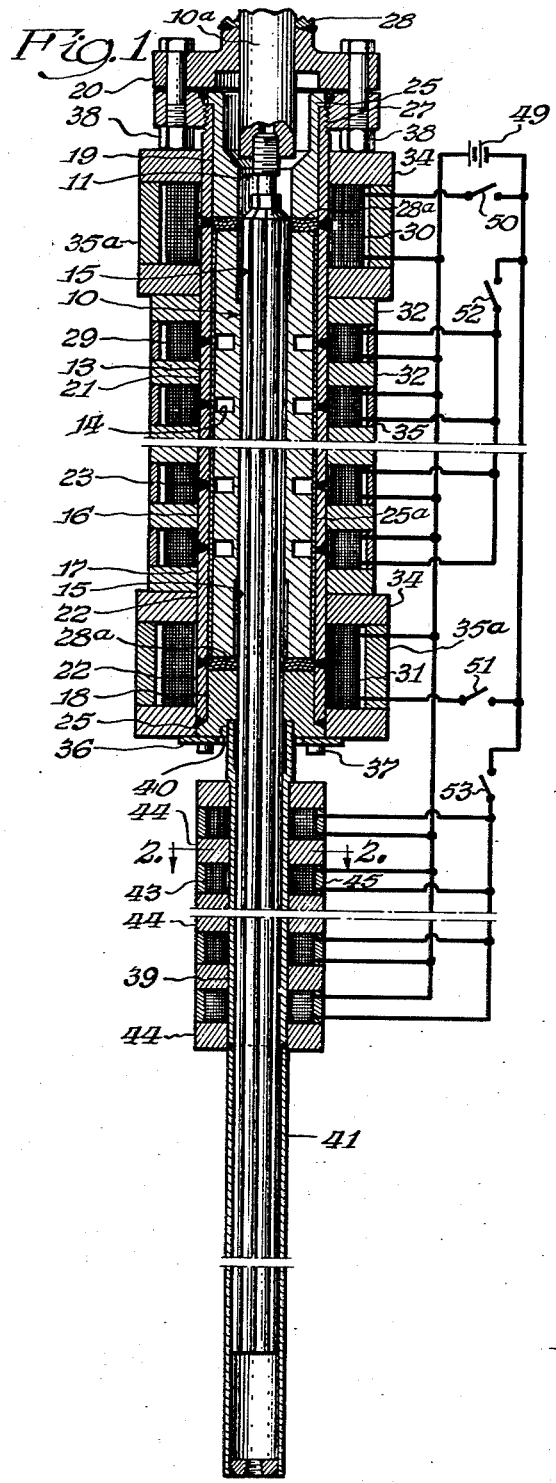
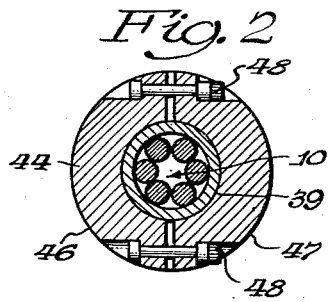
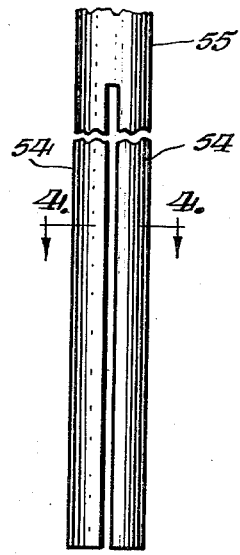
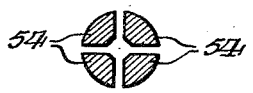
INVENTOR.
Joseph N. Young
BY
Roland A. Anderson
Attorney Aug. 20, 1957  J. N. YOUNG  2,803,761
ELECTROMAGNETIC APPARATUS FOR MOVING A ROD
Filed Sept. 10, 1956  2 Sheets-Sheet 2

INVENTOR.
Joseph N. Young
BY
Roland A. Anderson
Attorney

United States Patent Office 2,803,761
Patented Aug. 20, 1957

2,803,761

ELECTROMAGNETIC APPARATUS FOR MOVING A ROD

Joseph N. Young, Chicago, Ill., assignor to the United States of America as represented by the United States Atomic Energy Commission Application September 10, 1956, Serial No. 609,047

10 Claims. (Cl. 310—14)

This invention relates to an apparatus for moving an object in steps and more specifically to an electromagnetic linear motor for this purpose.

It is well known in the field of nuclear reactors to shift a control element of neutron-absorbing material with respect to a reactor for varying and controlling the reactivity level. The copending application of Joseph N. Young, Serial No. 548,555, filed November 22, 1955, discloses and claims electromagnetic apparatuses for shifting a control element in small amounts, which apparatuses function without the need for seals through which moving parts extend, because the control element and certain parts of the apparatuses are completely enclosed in a liquid-tight housing, while other parts of the apparatus are external to the housing and act thereacross by electromagnetic forces.

The present invention involves improvements of the apparatuses of the type disclosed in the copending Young application, which improvements are characterized by a more efficient magnetic circuit, elimination of wear effects, and reduction of the interference provided by dirt and impurities.

According to the present invention, an extension of the control element to be shifted is made mechanically flexible and a movable gripper mechanically inflexible, so that a gripping occurs between the gripper and the extension as a result of flexing of the extension. Moreover, there is provided a novel arrangement of stationary gripper and movable gripper such that the cycle of operations need only be reversed for reversing the direction in which the control element is shifted.

This invention might best de described by referring to the drawings in which:

Fig. 1 is a longitudinal sectional view of one form of the apparatus of the present invention;

Fig. 2 is a transverse section of the separate gripper along the line 2—2 of Fig. 1, showing a gripper unit and a control-rod extension;

Fig. 3 is a longitudinal view of a modified form of control element extension forming part of the present invention;

Fig. 4 is a transverse sectional view taken on the line 4—4 of Fig. 3;

Figure 5:
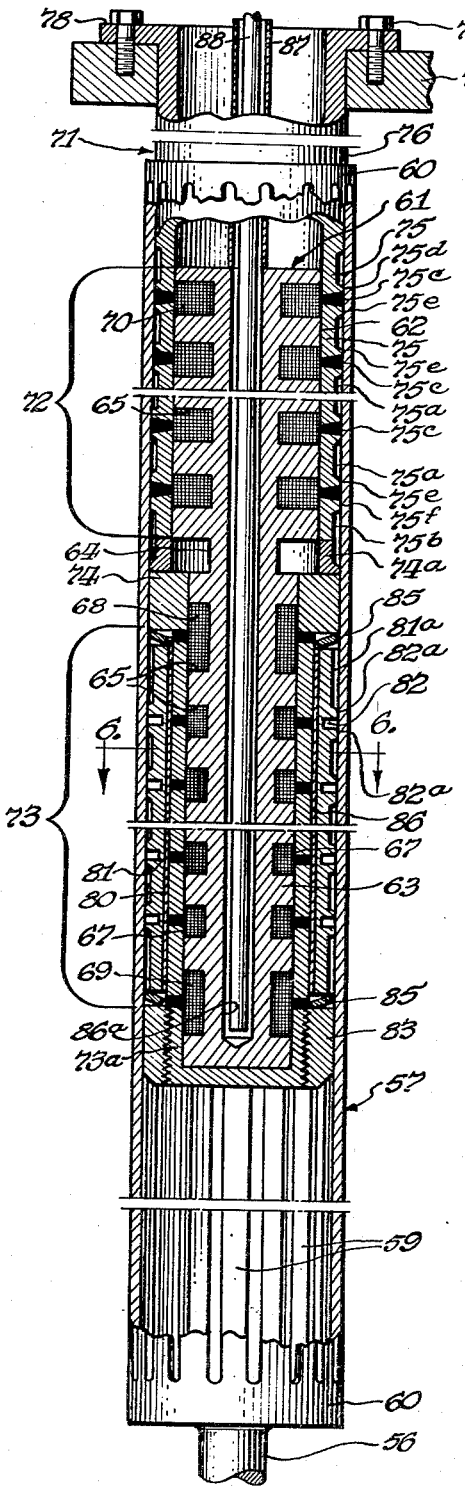
Fig. 5 is a longitudinal sectional view of another form of the present invention.

A group of rods 10 as shown in Figs. 1 and 2 may be attached to a control element 10a by a threaded adapter 11 to form an extension thereof. The control element 10a may be in the form of a rod that is formed at least in part of neutron-absorbing material. The rods 10 should be of a magnetic but corrosion-resistant material such as magnetic stainless steel. The rods 10 are surrounded by a gripping unit 13 formed of a tubular element of a magnetic material such as magnetic stainless steel. Exterior annular grooves 14, equally spaced from one another, are provided on the gripping unit 13 along the middle portion of the gripping unit as seen in Fig. 1. On either end of the gripping unit is a cavity 15 of slightly greater diameter than the inside diameter of the gripping unit along its middle portion. The gripping unit 13 is contained in a housing 16 comprising a sleeve 17, magnetic stops 18 and 19, and a coupling unit 20, all formed of magnetic material such as soft iron. The sleeve 17 is formed of a number of annular sections 21 positioned adjacent one another and joined to their adjacent sections by welds 23 of a nonmagnetic material, the welds along the middle portion being located opposite the annular grooves 14 of the gripping unit 13 and the outermost welds being located at the ends of the gripping unit 13. A thin-walled nonmagnetic stainless-steel sleeve 25a surrounds the gripping unit 13 within the sleeve 17 and has a length equal to that of the gripping unit 13.

The magnetic stops 18 and 19 are essentially tubular plugs inserted in the ends of the sleeve 17 and are provided with exterior lips 25 which abut the ends of the sleeve 17. The magnetic stop 18 is also welded to the end of the sleeve 17. At one end the sleeve 17 is provided with an exterior threaded section 27 connecting the sleeve with the coupling unit 20, which joins the sleeve 17 to a tube 28 extending into a neutronic reactor (not shown) and clamps the magnetic stop 19 against the end of the sleeve 17. At each end of the gripping unit 13 there is a cushion 28a composed of nested stacks of Belleville washers, one within the other, formed of magnetic stainless steel and a washer of nonmagnetic stainless steel directly against the end of the gripping unit 13.

A set of gripper coils 29 is disposed around the sleeve 17 in equally spaced relationship so that each gripper coil covers a weld 23 along the middle portion of the sleeve 17. Mover coils 30 and 31 are disposed around the sleeve 17 at the end portions thereof so that each coil covers one of the welds 23 adjacent to the ends of the sleeve 17. Spacer rings 32 formed of magnetic material such as soft iron embrace the sleeve 17 and are disposed between the gripper coils 29, and extend radially outward therebeyond. Magnetic spacer rings 34 embrace the sleeve 17 adjacent each end and on opposite sides of the mover coils 30 and 31 and extend radially outward therebeyond. Magnetic cover rings 35 and 35a surround the gripper coils 29 and the mover coils 30, respectively, and hold apart the spacer rings 32 and the spacer rings 34, respectively. A magnetic retainer ring 36, attached by screws 37 to the plug 18, holds the stack of spacer rings 32 and 34 and cover rings 35 and 35a on the sleeve 17 and tightly against the nuts 38.

Another gripping unit 39 surrounds the rods 10 and has one end disposed within a recess 40 formed in the magnetic stop 18, the unit 39 being secured therein by welding or soldering. The other end of the gripping unit 39 is attached to a tube 41 by soldering or welding.

Surrounding the gripping unit 39 is a set of gripper coils 43 spaced from one another by spacer rings 44 which extend radially outward beyond the gripper coils 43. Cover rings 45 are disposed around the gripper coils 43 and space apart the spacer rings 44 on either side of each gripper coil. As shown in Fig. 2, the spacer rings 44 are formed of half sections 46 and 47 held tightly around the gripping unit 39 by means of the nuts and bolts 48.

Fig. 1 includes a wiring diagram showing one method for connecting the coils to a power supply 49. The two mover coils 30 and 31 are connected in parallel across the power supply 49 through their respective switches 50 and 51. The gripper coils 29 are connected in parallel to the power supply 49 through a single switch 52 which enables all gripper coils 29 to be energized simultaneously. The gripper coils 29 are electrically connected in relation to each other so that the magnetic lines of force surrounding adjacent coils through their mutual spacer ring 32 are aiding one another. The mover coils 30 and 31 and the gripper coils 29 are electrically connected in respect to each other so that the flux lines surrounding the mover coils 30 and 31 and the outermost gripper coils 29 are opposed in their mutual spacer rings 32 and 34. The other gripper coils 43 are connected in parallel across the power supply 49 through a single switch 53 and so electrically arranged that the magnetic flux lines of adjacent coils 43 aid each other in their mutual spacer ring 44. The switches 50, 51, 52 and 53 may be operated manually, by a cam-operated mechanism, or by any other means which will energize the coils in proper sequence as hereinafter described.

It is noted that the nonmagnetic weld joints 23 in the sleeve 17, and the annular grooves 14 in the gripping unit 13 have been provided to create a greater concentration of magnetic lines of force around the associated gripper coil 29 through the control rods 12 thereby giving a more effective attraction force upon the rods 8.

Let it be assumed that the control element 10a is to be moved upward in steps as viewed in Fig. 1. At the beginning of any given cycle of operation, the gripper coils 43 are energized and all other coils are deenergized. The mover coil 31 is first energized to pull the gripping unit 13 which is disengaged from the rods 10 downward toward the magnetic stop 18. Next, the gripper coils 29 are energized causing the group of rods 10 to be attracted outwardly towards the gripping unit 13 and gripped therewith. Now, gripper coil 43 and the mover coil 31 are deenergized, and mover coil 30 is energized, thereby causing the gripping unit 13 to be attracted towards the magnetic stop 19, moving the rods 10 which are gripped with the gripping unit 13 upward therewith. Gripper coils 43 are then reenergized to hold the rods in their new position. The gripper coils 29 and the mover coils 30 and 31 are then deenergized returning the apparatus back to the beginning and ready for a new cycle of operation.

To move the rods 10 in a downward direction the cycle described above is just reversed. Again, with the gripper coils 43 energized at the beginning of the cycle and all other coils deenergized, the mover coil 30 is now energized causing the gripping unit 13 to be moved upward towards the magnetic stop 19. The gripper coils 29 are then energized causing the rods 10 to be gripped with the gripping unit 13. Now gripper coils 43 and mover coil 30 are deenergized, and mover coil 31 is energized, so that the gripping unit 13 with the rods 10, which are gripped therewith, are moved downwardly towards the magnetic stop 18. The gripper coils 43 are reenergized to hold the rods 10 in their new position and subsequently the mover coil 31 and the gripper coils 29 are deenergized to return the apparatus to the beginning of another cycle.

It can be seen by the following table, indicating sequence of operation, that the operation of the mechanism is reversible merely by reversing the sequence of the cycle.

| Sequence | 1 | 2 | 3 | 4 | 5 | 6 | 7 | 8 | 9 |
|---|---|---|---|---|---|---|---|---|---|
| Gripper Coils 43 | on | on | on |  |  |  | on | on | on |
| Mover Coil 30 |  |  |  |  | on | on | on |  |  |
| Gripper Coils 29 |  |  | on | on | on | on | on |  |  |
| Mover Coil 31 |  | on | on | on |  |  |  |  |  |

By reading the chart from left to right the sequence for moving the rods 10 upward, as viewed in Fig. 1, may be followed. Conversely, by reading the chart from right to left the sequence for moving the rods 10 downward may be followed. If the switches 50, 51, 52 and 53 are to be operated by cam means, it is to be noted that a change of direction in the operation of the mechanism may be accomplished by merely reversing the direction of the cam means.

If it is necessary to cause the rods 10 to move downwardly in a rapid manner, all of the coils 29, 30, 31 and 43 may be deenergized thereby causing the rods 10 to move downward by the force of gravity. This device may also be used in a horizontal position in which case the rapid movement of the rods may be accomplished by means of a spring loaded apparatus shown in Figs. 3 and 4 of the aforementioned Young application.

Figures 3 and 4 show a different configuration for the rod-like extensions wherein segments 54 are an integral part of a solid rod 55, which constitutes an extension of the control element 10a. The segments are formed by cutting longitudinal diametric transversely related slots extending from one end of the bar 55 through a substantial portion of its length. The segments are flexible enough to be attracted outwardly toward a gripper unit, such as gripper unit 13 shown in Fig. 1, to be gripped therewith.

Figure 6:
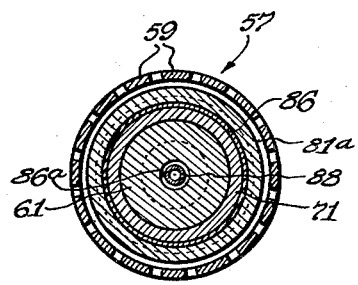
Fig. 6 is a transverse section of the apparatus along the line 6—6 of Figure 5.

Another form of applicant's invention, illustrated in Figs. 5 and 6 differs from that of Figs. 1–4 in that an extension 57 to a control element 56 lies outside, rather than inside, the gripping and moving means. These extensions take the form of a tubular member slotted except at its end so as to comprise flexible longitudinal strips 59 interconnected at end portions 60 of the tubular member. The tubular member is formed of a magnetic material such as magnetic stainless steel. Concentrically located within the extension 57 is a core 61 formed of a magnetic material such as soft iron. The core 61 is made up of an upper portion 62 and a lower portion 63 which are separated by a short midportion 64 having a smaller outer diameter than either the upper portion 62 or lower portion 63. Equally spaced annular grooves 65 are located along the upper portion 62 and the lower portion 63 for receiving coils to be hereinafter described. A set of gripper coils 67 are located around the lower portion 63 of the core 61 within the annular grooves 65 located therein. Mover coils 68 and 69 are positioned immediately adjacent either end of the set of gripper coils 67 and around the core 61 in annular grooves 65 located therein. Another set of gripper coils 70 is located in the annular grooves 65 provided in the upper portion 62 of the core 61.

A pressure shell 71, which fits between the control-element extension 57 and the core 61, comprises an upper gripper portion 72, a lower portion 73 smaller in diameter than the upper portion, a hollow magnetic plug 73a closing the lower portion, a magnetic annulus 74, and a non-magnetic annulus 74a, these annuli connecting the portions 72 and 73 with one another. The annulus 74 may be termed a magnetic stop. The gripper portion 72 is composed of an upper magnetic ring 75, intermediate magnetic rings 75a, a lower magnetic ring 75b, and nonmagnetic welds 75c joining the rings to one another. The upper ring 75 has an external annular lip 75d at its lower end, each intermediate ring 75 has external annular lips 75e at both ends, and the lower ring 75b has an external annular lip 75f at its upper end, so that the control-element extension 57 engages these rings only at the lips 75d, 75e and 75f and at the welds 75c joining these rings. The lips 75d, 75e, and 75f and the weld 75c lie opposite the coils 70 in the upper portion 62 of the core 61, so that flux produced by these coils is concentrated at these lips and the gripper 72 more effectively attracts and holds the extension 57.

A tubular section 76, secured to the gripper portion 72 so as to form part of the pressure shell 71, extends through a pressure vessel 77 and has a flange 78 resting on the wall. Screws 79 extend through the flange 78 and are threaded into the pressure vessel 77 to secure the pressure shell 71 thereto. The tubular section 76 is formed of a nonmagnetic material such as nonmagnetic stainless steel if it is to house a coil (not shown) for indicating the position of the extension 57 and thus the position of the control element 56. The pressure vessel 77 forms part of a neutronic reactor (not otherwise shown), which includes a liquid at high pressure tightly contained by the vessel 77 and the pressure shell 71.

The lower portion 73 of the pressure shell 71 is formed of magnetic rings 80 and nonmagnetic welds 81 which join the rings to one another, to the magnetic annulus 74, and to the plug 73a. The welds 81 lie opposite the mover coils 68 and 69 and the gripper coils 70 on the lower portion 63 of the coil 61. A gripping unit 81a, in the form of a tubular element, concentrically surrounds the lower portion 73 of the shell 71 but lies within the control-element extension 57. The gripping unit 81a is formed of a magnetic material such as magnetic stainless steel and is provided with external annular grooves 82 disposed so that each of said grooves surrounds one of the gripper coils 67. At each side of each groove 82 there is an external annular lip 82a formed on the gripping unit 81a, so that the control-element extension 57 engages the gripping unit only at the lips 82a, whereby flux produced by the coils 67 is concentrated at the lips, and the gripping unit 81a more effectively attracts and holds the extension 57. A stop 83 of magnetic material is threaded on the plug 73a. At each end of the gripping unit 81a is a cushion 85, which because of space limitations may take the form of a single magnetic Belleville washer and a thin nonmagnetic washer. A thin-walled cylindrical sleeve 86 formed of nonmagnetic stainless steel is disposed between the lower portion 73 of the shell 71 and the gripping unit 81a to prevent sticking therebetween caused by residual magnetism.

A cavity 86a is axially disposed almost completely through the core 61 having its open end at the end of the core 61 comprising the upper portion 62. A thin-walled tube 87 is concentrically located within the upper portion of the shell 71 having one end connected to the upper end of the core 61 to form an extension of the axial cavity 86a to a point above the flanged end of the shell 71. Concentrically located within the cavity 86a and its tubular extension 87 is another thin-walled tube 88. The cavity 66 with its extension tube 87 and the tube 88 form a means for cooling the core 61 by forcing a coolant liquid therethrough.

The electrical circuit to energize the coils is the same as shown in Fig. 1 and described earlier in conjunction with that figure, and consequently it is not shown in Fig. 5. The energizing of either of the gripper coils 70 or 67 produces a magnetic flux around the respective coils through the core 61, shell 71 and the control-element extension 57 to cause the longitudinal strips 59 to be attracted inwardly, to grip with the gripping unit 72 or the gripping unit 81a, respectively. The energizing of the upper mover coil 68 or lower mover coil 69 will cause the gripping unit 81a to be attracted towards the associated magnetic stop 74 or 83 depending upon which coil is energized.

Let us assume that the control rod 56 and its extension 57 is to be moved in steps in a downward motion as viewed in Fig. 5. A sequence for moving the extension one step begins with the set of gripper coils 67 and the two mover coils 68 and 69 deenergized and the upper set of gripper coils 70 energized. The upper mover coil 68 is then energized causing the gripper unit 81a to be attracted upwardly towards the magnetic stop 74. The set of gripper coils 67 is then energized to cause the strips 59 of the extension 57 to be gripped with the gripping unit 77 while the gripper coil 70 is deenergized. The mover coils 68 are then deenergized and the mover coil 69 is simultaneously energized thereby causing the gripping unit 81a and the control rod extension 57 to be attracted towards the magnetic stop 83 by the combined forces of the magnetic attraction and gravity. The gripper coils 70 are then energized and the gripper coil 67 and the mover coils 69 are deenergized to return the apparatus to the beginning of another sequence.

To move the control rod 56 and its extension 57 in an upward direction the cycle of operation is just reversed. With only the set of gripper coils 70 energized at the beginning of the sequence, the mover coil 69 is first energized to cause the gripping unit 81a to be attracted downwardly towards the magnetic stop 83. The mover coil 68 and the gripper coils 70 are then deenergized and the gripper coils 67 are energized to cause the extension 57 to be gripped with the gripping unit 81a. The energization of the upper mover coil 68 then causes the gripping unit 81a to be attracted towards the magnetic stop 74 and moves the control rod extension 57 upward one step. The gripper coils 70 are then energized to cause the control rod extension to be held in its new position. The gripper coils 67 and the mover coils 68 are then deenergized to return the apparatus to the beginning of a new sequence.

In both embodiments of this invention the movement of mechanical members through pressure proof seals is eliminated by use of pressure tight housings separating the moving mechanisms and the activating means for causing the moving mechanism to operate. In the embodiment of Fig. 1, the housing 16, separates the coils from the moving mechanism (i. e., the gripping unit 13) so that the control rod extensions are not required to operate through a pressure tight seal. In the device pictured in Fig. 5, the shell 71 encases the coils therein and separates them from the moving mechanism, (i. e., the gripping units 81a) thereby eliminating the need for pressure proof seals. The embodiment in Fig. 1 has been designed for use in conjunction with a neutronic reactor wherein the control element driving mechanism is located outside of the reactor casing and connected thereto by the sleeve 28. The embodiment in Fig. 5 has been designed for use when the control rod driving mechanism is to be located within the outer casing of a nuclear reactor containing a liquid at high pressures.

The applicant extends the scope of this application to all obvious modifications and embodiments of the described device and intends to be limited only by the scope of the appended claims.

What is claimed is:

1. An apparatus for moving a control element longitudinally in steps comprising a transversely flexible extension to said control element, a first gripping unit disposed longitudinally along a portion of said extension, a first set of gripper coils associated with said gripping unit, two mover coils disposed immediately adjacent to either side of said set of gripper coils and longitudinally along said extension, a second gripping unit disposed longitudinally along another portion of said extension, a second set of gripper coils associated with said second gripping unit, means for energizing said first set of gripper coils thereby activating said gripping unit to cause said extension to be transversely deflected toward said first gripping unit and gripped therewith, means for energizing one of said mover coils thereby attracting said first gripping unit toward said energized mover coil, and means for energizing said other set of gripper coils thereby energizing said second gripping unit to cause said extension to be transversely deflected toward and gripped therewith.

2. An apparatus for moving a control element longitudinally in steps, comprising a plurality of rods formed as a longitudinal extension of the control element, a first gripping unit surrounding said rods, a first set of gripper coils associated with said first gripping unit, two mover coils disposed immediately adjacent to either side of said first set of gripper coils and surrounding said plurality of rods, a second gripping unit disposed longitudinally along and surrounding said plurality of rods at a distance from said first gripper coils and said two mover coils, a second set of gripper coils associated with said second gripping unit, means for energizing said first set of gripper coils thereby activating said first gripping unit to cause said rods to be attracted to said gripping unit and gripped therewith, means for energizing one of said mover coils thereby moving said first gripper unit toward said energized mover coil, and means for energizing said second set of gripper coils thereby energizing said second gripping unit to cause said rods to be attracted to and gripped therewith.

3. A device essentially as claimed in claim 2, and further comprising a cylindrical sleeve surrounding said first gripping unit and comprising separate annular magnetic sections arranged in a row and nonmagnetic welds joining the magnetic sections in spaced relation to one another, the mover coils and the gripper coils of the first set surrounding said cylindrical sleeve along its middle portion and spaced along said cylindrical sleeve so that each coil covers one of the welds.

4. A device essentially as claimed in claim 3 wherein said other gripping unit comprises another metallic sleeve surrounding said rods, and the gripper coils of the second set surrounding said other sleeve and spaced from one another longitudinally along the other sleeve.

5. A device essentially as claimed in claim 3, wherein said first gripping unit comprises a tubular element receiving said rods and having annular grooves located within the gripper coils of said first set and the associated welds of the sleeve.

6. An apparatus essentially as claimed in claim 1, wherein said transversely flexible extension is a tubular member slotted except at its ends so as to comprise longitudinal strips interconnected at the ends of the tubular member, and wherein said first and second sets of gripper coils and said two mover coils are contained within said tubular member.

7. An apparatus essentially as claimed in claim 6 and further comprising a cylindrical sleeve in said tubular member and surrounding said first set of gripper coils and said two mover coils and comprising separate annular magnetic sections arranged in a row and nonmagnetic welds joining the magnetic sections in spaced relation with one another, each of said welds surrounding a mover coil or one of the gripper coils of said first set.

8. An apparatus essentially as claimed in claim 7, wherein said first gripper unit comprises a tube positioned within said tubular member and surrounding said sleeve and having annular grooves spaced to coincide with the nonmagnetic welds in said sleeve.

9. An apparatus essentially as claimed in claim 6, wherein said other gripping unit comprises a cylindrical sleeve surrounding said second set of gripper coils and positioned within the hollow portion of said cylindrical tube, said cylindrical sleeve comprising magnetic annular sections arranged in a row and joined by nonmagnetic welds, each of said welds surrounding an associated individual gripper coil of said second set.

10. An apparatus for moving a control element longitudinally in steps, comprising a magnetic tubular member forming an extension to said control element and having longitudinal slots describing longitudinal strips integral with end portions of said tube, a first set of gripper coils spaced longitudinally along the axis of said tubular member and positioned therewithin, two mover coils disposed adjacent either end of said set of gripper coils and within said tubular member, a magnetic cylindrical sleeve having one end open and the other end closed and being positioned within said tubular member and surrounding said set of gripper coils and said two mover coils, a magnetic tube positioned within said first cylindrical tube to surround said set of gripper coils and having each end surrounding one of said mover coils, a second set of gripper coils positioned within the tubular member and spaced longitudinally along another portion of the axis of said tubular member displaced from the portion of said axis where the mover coils and first set of gripper coils are located, a second magnetic cylindrical sleeve positioned within said tubular member and surrounding said second set of gripper coils, and means joining said second sleeve and the open end of said first sleeve.

No references cited.